US011747582B2

(12) United States Patent
Jeong et al.

(10) Patent No.: US 11,747,582 B2
(45) Date of Patent: Sep. 5, 2023

(54) OPTICAL CABLE INCLUDING ROLLABLE OPTICAL FIBER RIBBON

(71) Applicant: TAIHAN Fiberoptics CO., LTD., Ansan-si (KR)

(72) Inventors: Sam Mo Jeong, Seoul (KR); Chang Ahn KiM, Hwaseong-si (KR); Do Hyun Kang, Hongseong-gun (KR); Chang Young Kim, Yesan-gun (KR)

(73) Assignee: TAIHAN FIBEROPTICS CO., LTD., Ansan-si (KR)

(*) Notice: Subject to any disclaimer, the term of this patent is extended or adjusted under 35 U.S.C. 154(b) by 0 days.

(21) Appl. No.: 17/556,867

(22) Filed: Dec. 20, 2021

(65) Prior Publication Data

US 2023/0194814 A1    Jun. 22, 2023

(30) Foreign Application Priority Data

Dec. 20, 2021   (KR) .................... 10-2021-0182847

(51) Int. Cl.
  *G02B 6/44*   (2006.01)
(52) U.S. Cl.
  CPC ............... *G02B 6/44384* (2023.05)

(58) Field of Classification Search
  CPC ................ G02B 6/4494; G02B 6/44384
  See application file for complete search history.

(56) References Cited

U.S. PATENT DOCUMENTS

| 2019/0049681 A1* | 2/2019 | Bookbinder | G02B 6/4429 |
| 2020/0132952 A1* | 4/2020 | Debban | G02B 6/4403 |
| 2020/0301087 A1* | 9/2020 | Heinz | G02B 6/4436 |

* cited by examiner

*Primary Examiner* — Sung H Pak
*Assistant Examiner* — Hoang Q Tran
(74) *Attorney, Agent, or Firm* — LEX IP MEISTER, PLLC

(57) ABSTRACT

An optical cable including a rollable optical fiber ribbon is provided. The optical cable includes a plurality of loose tubes, and a plurality of rollable optical fiber ribbons are disposed inside each loose tube. A plurality of loose tubes are disposed at the periphery of the central strength member. The length of each rollable optical fiber ribbon disposed inside the loose tube is 1% or more longer than the length of the corresponding loose tube.
Compared to an optical cable including a conventional ribbon, the optical fiber has a higher density and preferred transmission performance.

7 Claims, 9 Drawing Sheets

OPTICAL CABLE INCLUDING ROLLABLE OPTICAL FIBER RIBBON

BACKGROUND OF THE INVENTION

1. Field of the Invention

The present invention relates to an optical cable including optical fiber ribbon that can be curled or folded.

2. Description of the Related Art

With the recent spread of 5G communication technology and increases of data centers, demand for ultra-high-density optical cables with a large number of optical fibers per unit area is increasing. Increased density of optical fibers reduces the diameter of the optical cable and reduces installation costs as existing facilities such as underground ducts can be used.

In this regard, rollable fiber optic ribbons have been proposed. For example, Japanese Patent Laid-Open No. 2007-279226, Japanese Patent Laid-Open No. 2011-169937, Japanese Patent Laid-Open No. 2014-228688, and U.S. Pat. No. 8,787,718 disclosed optical fiber ribbon fabricated by intermittently connecting a plurality of optical fibers and made to be rolled. U.S. Pat. No. 9,939,599 and 10,185,105 disclose optical fiber ribbons having continuous connections among a plurality of optical fibers and made to be rolled or folded.

Although the density of optical fibers in the optical cable including optical fiber ribbons that are rollable or foldable can be much increased, transmission loss could be deteriorated by micro-bending caused by such higher density.

SUMMARY OF THE INVENTION

An object of the present invention is to provide an optical cable including optical fiber ribbons which increase the density of optical fibers in the optical cable compared to the optical fiber ribbon connected continuously and also having preferred transmission performance.

According to an aspect of the present invention, there is provided an optical cable including rollable optical fiber ribbon, comprising: a core portion and a jacket surrounding the core portion, the core portion including: a central strength member; one or more loose tubes arranged around the central strength member; and, one or more rollable optical fiber ribbons being positioned in the respective loose tube, at least parts of the optical fibers of which are intermittently connected along the lengthwise direction, wherein the length of each rollable optical fiber ribbon disposed inside the loose tube is 1% or more longer than the length of the corresponding loose tube, and wherein the terminating loss of each optical fiber of each rollable optical fiber ribbon is 0.4 dB/km or less at a wavelength of 1310 nm and 1383 nm, and 0.3 dB/km or less at a wavelength of 1550 nm and 1625 nm.

Preferably, the density of the optical fiber of each loose tube is 6.7 to 7.5 per square millimeter of the cross-sectional area of the inner space of the corresponding loose tube.

The number of rollable optical fiber ribbons disposed inside each of the loose tubes is 6 to 12.

The core portion may further include a waterproof yarn that absorbs water.

The core portion may also further include a filler disposed in the empty space between the loose tubes to maintain circular shapes of the cross sections of the loose tubes.

According to the present invention, an optical cable is provided which includes optical fiber ribbons that increase the density of optical fibers in the optical cable compared to the optical fiber ribbon connected continuously and also has preferred transmission performance.

DETAILED DESCRIPTION OF THE INVENTION

Figure 1:
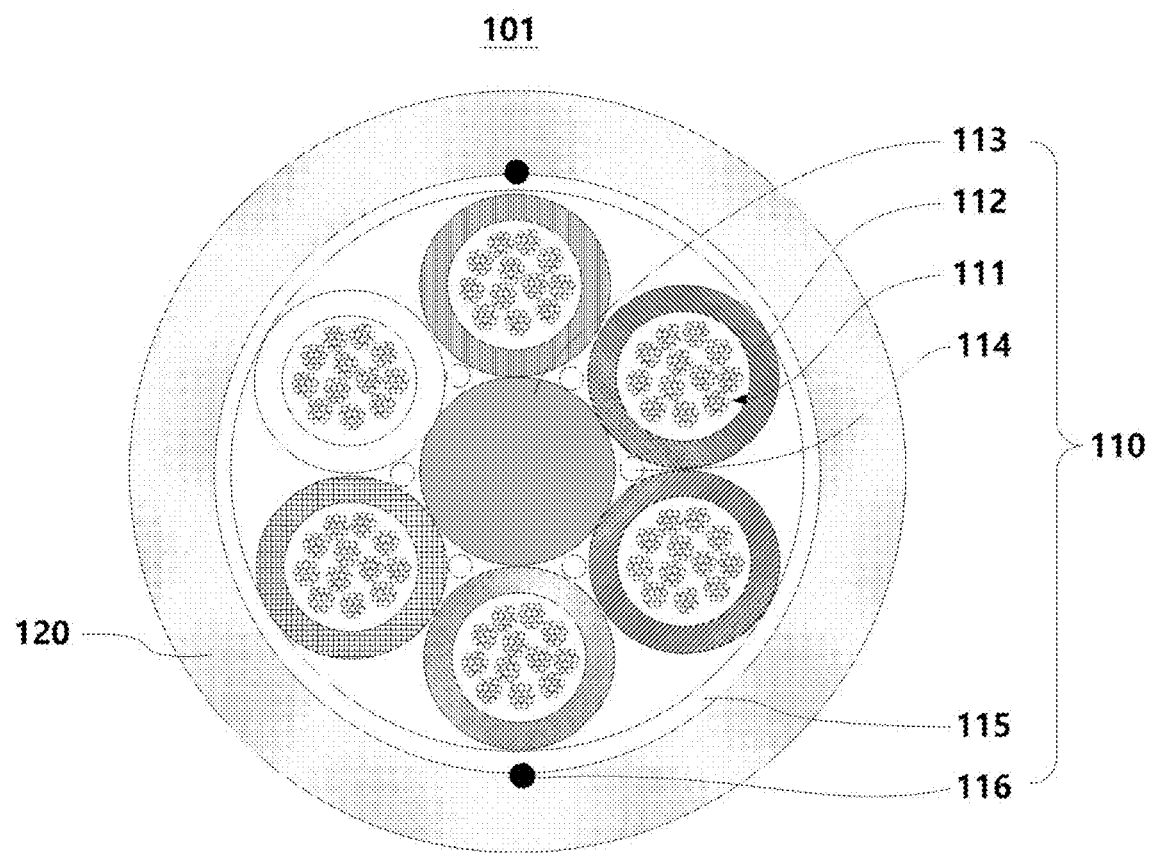
FIG. 1 depicts an optical cable in accordance with an embodiment of the present invention, which includes rollable optical fiber ribbons.

Hereinafter, exemplary embodiments of the present Embodiments of the present invention will be described in detail with reference to the accompanying drawings hereinafter. The same or similar reference numerals are assigned to the same or similar components, and redundant descriptions thereof will be omitted. In describing the embodiments disclosed in the present specification, when it is determined that a detailed description of related known technologies may obscure the subject matter of the embodiments disclosed in the present specification, the detailed description thereof will be omitted. The accompanying drawings are only for making it easier to understand the embodiments disclosed in the present specification, and the technical concepts disclosed in the present specification are not limited by the accompanying drawings.

Terms including ordinal numbers such as "first" and "second" can be used to describe various components, but these terms are only used to distinguish one component from another, and the technical meanings of corresponding components are not limited by these terms. Singular expressions such as "a" or "an" include plural expressions also unless the context clearly indicates otherwise.

As used herein, terms such as "comprises", "includes" or "have" should be understood as limiting the existence of features, steps, components, or combinations thereof described in the specification, and one or more other features. It is not intended to exclude the possibility of the presence or addition of features, steps, components, or combinations thereof.

FIG. 1 is a cross-sectional view of an optical cable in accordance with an embodiment of the present invention.

The optical cable 101 includes a core portion 110 and a jacket 120 surrounding and protecting the core portion 110.

The core portion 110 includes at least one loose tube 112 having one or more rollable optical fiber ribbons 111 disposed therein. The core portion 110 also includes a central tension member 113, a waterproof yarn 114, a waterproof tape 115 and a ripcord 116. Although not shown, an armor layer surrounding the core portion 110 may be additionally provided to protect the same. The armor layer is generally formed of a metal tape.

In the illustrated embodiment, twelve (12) rollable optical fiber ribbons 111 are disposed inside each loose tube 112. However, the present invention is not limited thereto, and various numbers of rollable optical fiber ribbons 111 from 6 to 12 may be disposed. Preferably, the density of the optical fiber disposed inside each loose tube 112 is 6.7 to 7.5 per square millimeter (fibers/mm$^2$) of the cross-sectional area of the inner space of the corresponding loose tube. A plurality of rollable optical fiber ribbons disposed inside each loose tube 112 may be twisted together in one direction. The structure of the rollable optical fiber ribbon 111 will be described in detail later.

The optical cable shown in FIG. 1 is shown to have six (6) loose tubes 112. These loose tubes 112 are disposed around the central strength member 113. The loose tube 112 may be disposed in, for example, an SZ-twist with respect to the central strength member. The cross section of the loose tube 112 remains substantially circular.

At least one waterproof yarn 114 including a water absorption material is disposed between the central strength member 113 and the loose tube 112. The waterproof yarn 114 absorbs moisture penetrating into the jacket 120 from the outside. The location of the waterproof yarn 114 is not necessarily limited between the central tension member 113 and the loose tube 112.

A waterproof tape 115 is disposed to wrap the central tension member 113, the loose tube 112 and the waterproof yarn 114. The waterproof tape 115 prevents moisture from penetrating into the inner space of the core portion 110 from the outside of the optical cable.

The rip cord 116 is provided to tear the jacket 120 to expose the core portion 110 to the outside. In the illustrated embodiment, the two (2) rib cords 116 are disposed to face each other in the radial direction of the core part 110. When an armor layer is provided, the rip cord 116 is disposed within the armor layer.

The jacket 120 is generally extruded and made of a thermoplastic resin. The jacket 120 functions to protect the core portion 110. The jacket 120 may be colored, if necessary, or include a flame retardant material.

Figure 2:
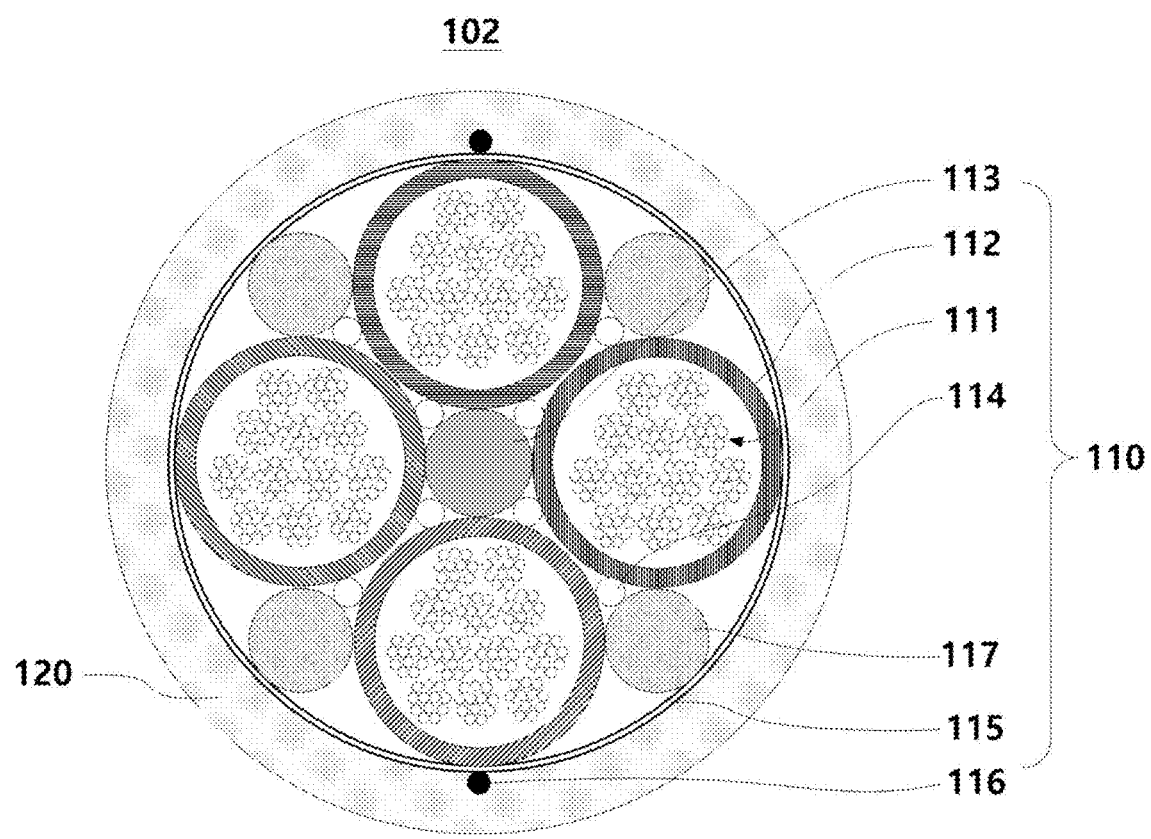
FIG. 2 depicts an optical cable in accordance with other embodiment of the present invention, which includes rollable optical fiber ribbons.

FIG. 2 shows other embodiment of an optical cable in accordance with the present invention.

The difference from the embodiment shown in FIG. 1 is that the core portion 110 includes four loose tubes 112. In this case, the cross-section of the loose tube 112 may not maintain a circular shape and may be deformed. When the cross-section of the loose tube 112 is deformed, microbending may occur in the rollable optical fiber ribbon 111, resulting in transmission loss. To prevent this, one or more filling members 117 are provided. In the illustrated embodiment, four filling elements 117 are provided.

In the illustrated embodiments, in order to prevent transmission loss, the length of each rollable optical fiber ribbon 111 disposed inside each loose tube 112 is 1% or more longer than the length of the corresponding loose tube 112. More preferably, the length of the rollable optical fiber ribbon 111 is longer than the length of the loose tube 112 by 1.001 to 1.003%.

Table 1 shows the results of transmission loss tests for the optical cable shown in FIG. 2, in which twelve (12) rollable optical fiber ribbons 111 are disposed inside each loose tube 112. Each rollable fiber optic ribbon disposed inside each loose tube is at least 1% longer than the length of the corresponding loose tube. As transmission loss, termination loss for 4 wavelengths was measured for a 1,200 m long optical cable. The termination loss is preferably 0.4 dB/km or less for wavelengths of 1310 nm and 1383 nm, and preferably 0.3 dB/km or less for wavelengths of 1550 nm and 1625 nm.

TABLE 1

| | Wave length | Terminal Loss (dB/km) | | | |
|---|---|---|---|---|---|
| | | 1310 nm | 1383 nm | 1550 nm | 1625 nm |
| First loose tube | Mean | 0.336 | 0.285 | 0.199 | 0.221 |
| | Min | 0.327 | 0.212 | 0.182 | 0.201 |
| | Max | 0.348 | 0.351 | 0.226 | 0.260 |
| Second loose tube | Mean | 0.335 | 0.284 | 0.198 | 0.219 |
| | Min | 0.326 | 0.146 | 0.183 | 0.198 |
| | Max | 0.352 | 0.373 | 0.235 | 0.275 |
| Third loose tube | Mean | 0.337 | 0.286 | 0.206 | 0.226 |
| | Min | 0.326 | 0.232 | 0.189 | 0.201 |
| | Max | 0.350 | 0.337 | 0.243 | 0.278 |
| Fourth loose tube | Mean | 0.335 | 0.288 | 0.202 | 0.222 |
| | Min | 0.326 | 0.239 | 0.188 | 0.203 |
| | Max | 0.347 | 0.326 | 0.232 | 0.259 |

From Table 1, it can be seen that in all the loose tubes, the maximum optical transmission loss of each wavelength is smaller than the preferred values.

In contrast, when the length of the rollable optical fiber ribbon is less than 1% longer than the length of the loose tube, the transmission loss exceeds the preferred values.

Figure 3:
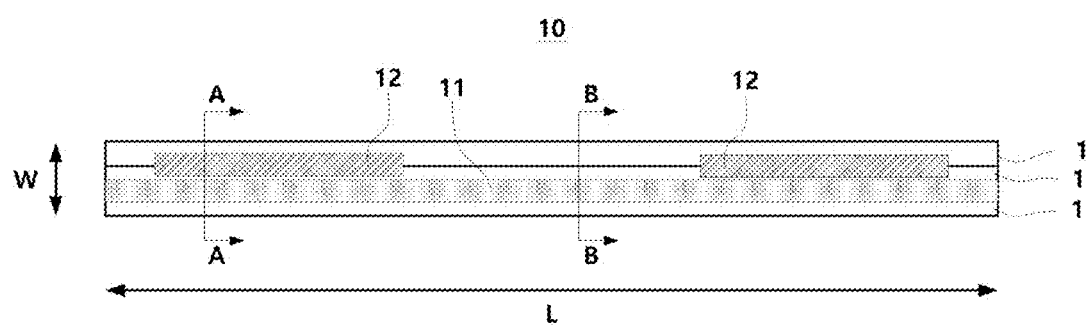
FIG. 3 shows an optical fiber unit of a rollable optical fiber ribbon according to an embodiment of present invention.

FIG. 3 shows an embodiment of an optical fiber unit for the rollable ribbon according to the present invention. In the present specification, "longitudinal direction" refers to a direction (L) in which an optical fiber is extended, as shown in FIG. 3, and "width direction" refers to a direction (W) which is orthogonal to longitudinal direction and in which optical fibers are arranged.

The optical fiber unit 10 includes three optical fibers 1. In the embodiment, the optical fiber has a core, a cladding and at least one coating layer. Of these three (3) optical fibers, two (2) optical fibers are connected in the longitudinal direction by a continuous connection 11 to form an optical fiber pair. The remaining one (1) optical fiber is intermittently connected to one optical fiber of the optical fiber pair in the longitudinal direction by the intermittent connection 12. In order to distinguish from the intermittent connection between the optical fiber units described later, the intermittent connection of the optical fiber unit 10 is referred to as a "first" intermittent connection 12.

Figure 4:
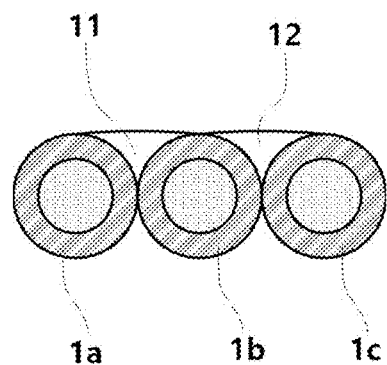
FIG. 4 is a cross-sectional view taken along line A-A of FIG. 3.
Figure 5:
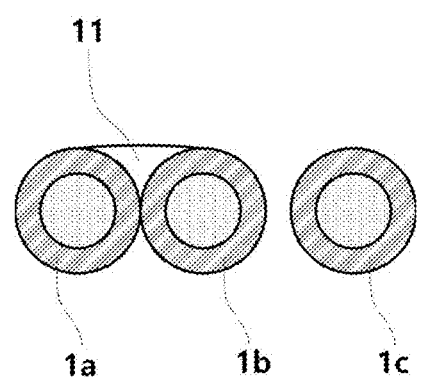
FIG. 5 is a cross-sectional view taken along line B-B of FIG. 3.

FIGS. 4 and 5 are cross-sectional views taken along line A-A and line B-B of FIG. 3, respectively. In the section in which the first intermittent connection 12 exists, the optical fiber pair 1a and 1b and the remaining one (1) optical fiber 1c are connected by the first intermittent connection 12, thereby the three optical fibers 1a, 1b, 1c are all connected. On the other hand, in the section in which the first intermittent connection 12 does not exist, the optical fiber pair 1a and 1b and the remaining one (1) optical fiber 1c are not connected to each other.

Figure 6:
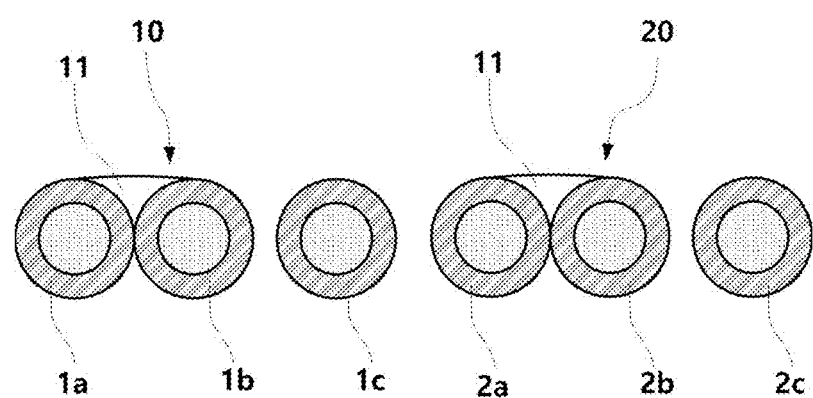
FIG. 6 shows a first possible arrangement using two optical fiber units shown in FIG. 3.
Figure 7:
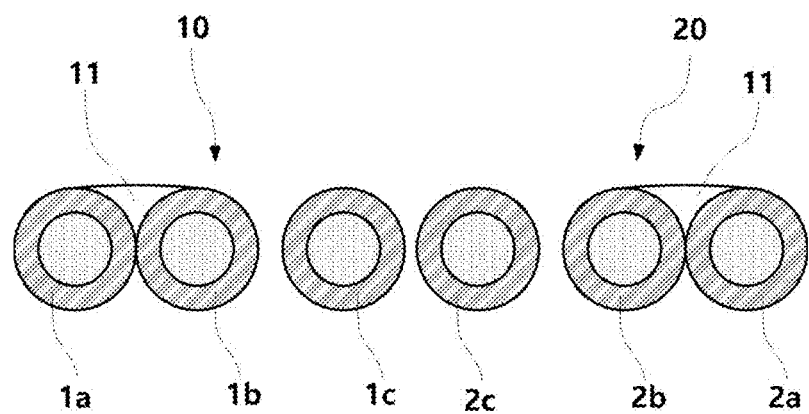
FIG. 7 shows a second possible arrangement using two optical fiber units shown in FIG. 3.
Figure 8:
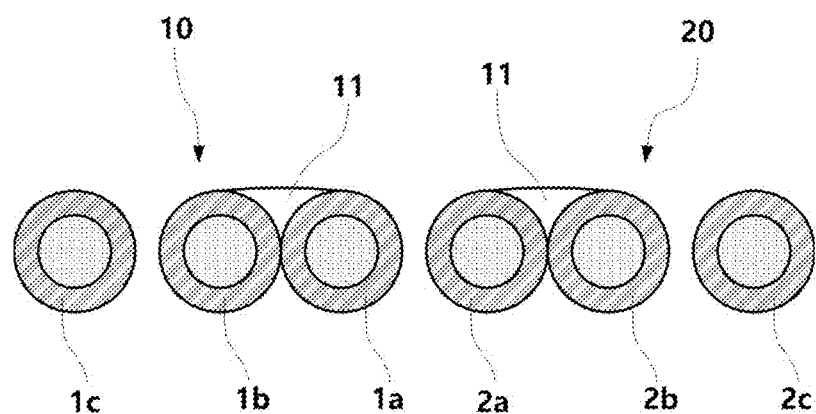
FIG. 8 shows a third possible arrangement using two optical fiber units shown in FIG. 3.

FIGS. 6-8 show possible arrangements of two optical fiber units described above, respectively. In the arrangement shown in FIG. 6, an optical fiber 1c not forming an optical fiber pair in the first optical fiber unit 10 and an optical fiber 2a included in the optical fiber pair of the second optical fiber unit 20 are positioned adjacent to each other. In the arrangement shown in FIG. 7, an optical fiber 1c that does not form an optical fiber pair in the first optical fiber unit 10 and an optical fiber 2c that does not form an optical fiber pair in the second optical fiber unit 20 are positioned adjacent to each other. In the arrangement shown in FIG. 8, the optical fiber 1a included in the optical fiber pair of the first optical fiber unit 10 and the optical fiber 2a included in the optical fiber pair of the second optical fiber unit 20 are positioned adjacent to each other. In each arrangement depicted in each Figure, if adjacent optical fibers of the two optical fiber units 10 and 20 are connected, an optical fiber ribbon including six optical fibers can be formed. In addition, when this connection is intermittent, the fiber optic ribbon may be rolled or folded in the width direction.

Figure 9:
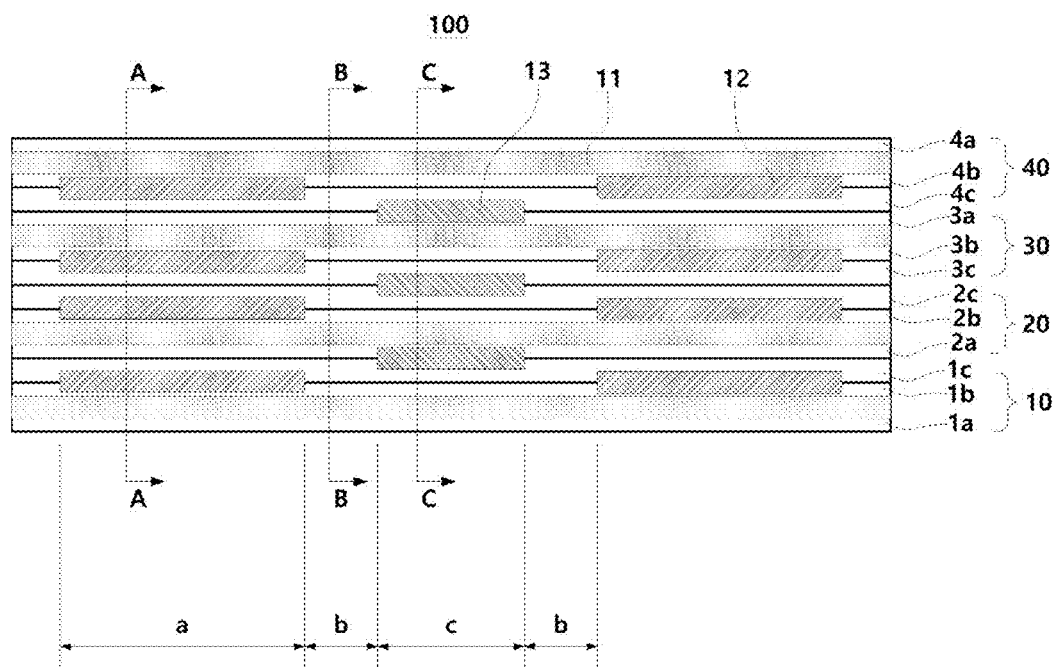
FIG. 9 shows a first embodiment of the rollable optical fiber ribbon including twelve (12) optical fibers using the optical fiber unit shown in FIG. 3.
Figure 14:
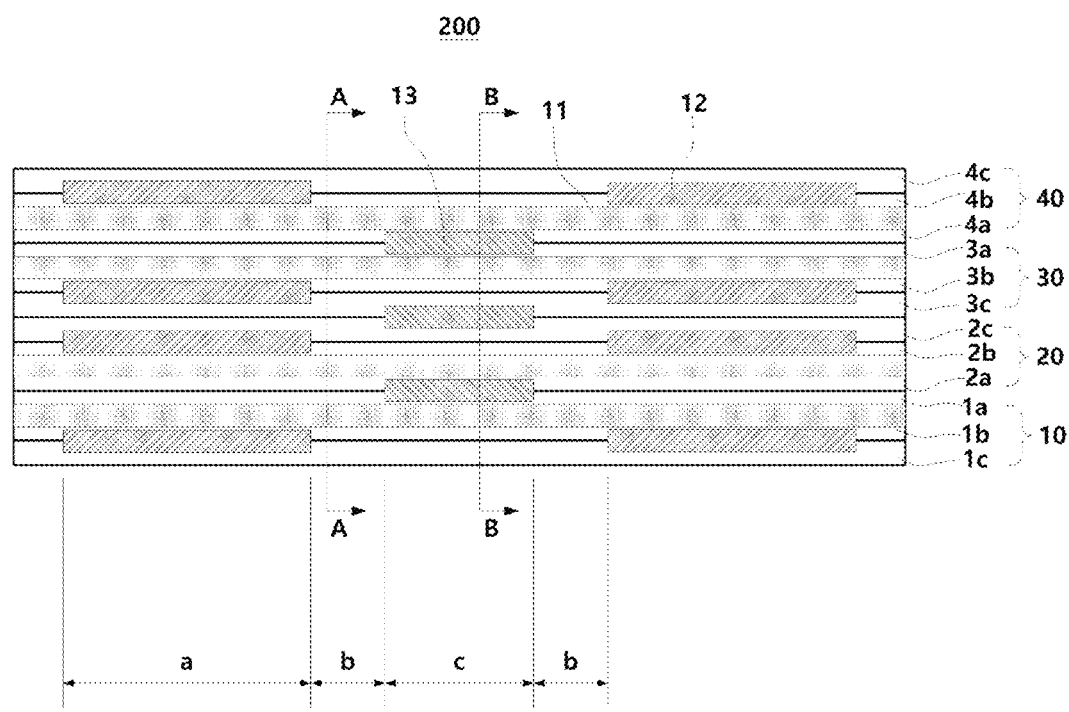
FIG. 14 shows a second embodiment of the rollable optical fiber ribbon including twelve (12) optical fibers using the optical fiber unit shown in FIG. 3.

There are a plurality of arrangements for forming an optical fiber ribbon comprising twelve (12) optical fibers by using the optical fiber unit shown in FIG. 3. In this specification, two (2) embodiments among these arrangements will be described. An embodiment of the first possible arrangement is shown in FIG. 9 and other embodiment of the second possible arrangement is shown in FIG. 14. Each embodiment is the same in that it includes four optical fiber units 10, 20, 30 and 40, but the arrangement of the optical fiber units is different from each other.

In the optical fiber ribbon 100 shown in FIG. 9, the two optical fiber units 10 and 20 are in the arrangement shown in FIG. 6, and the remaining two optical fiber units 30 and 40 are symmetrical of the arrangement shown in FIG. 6. The optical fiber units are intermittently connected in the longitudinal direction. In the present specification, a connection part for intermittently connecting the optical fiber units along the longitudinal direction is referred to as a "second" intermittent connection 13.

In the embodiment shown in FIG. 9, the first intermittent connection 12 of the optical fiber units 10, 20, 30, and 40 have the same length a and are arranged side by side in the width direction. The second intermittent connection 13 connecting the optical fiber units have the same length c and are arranged side by side in the width direction. The distance between the first intermittent connection 12 and the second intermittent connection 13 is indicated by the reference numeral b. In the illustrated embodiment, the spacing between the second intermittent connection 13 and either of the two (2) first intermittent connection 12 adjacent in the longitudinal direction is the same. In the following, a reference sign indicating its length a, c or spacing b is used for indicating a corresponding section.

Figure 10:
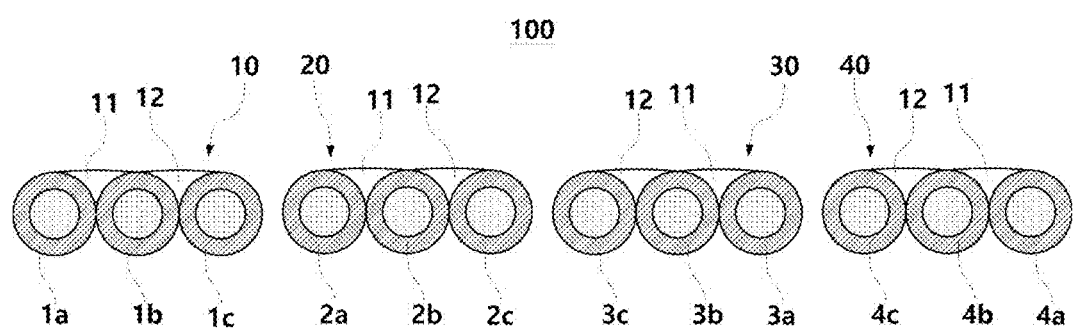
FIG. 10 is a cross-sectional view taken along line A-A in FIG. 9.
Figure 11:
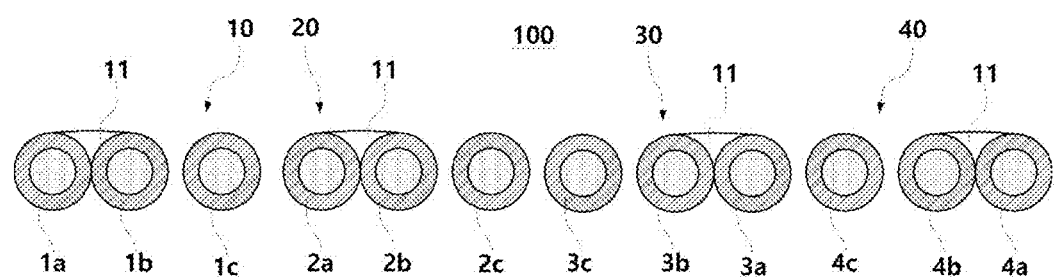
FIG. 11 is a cross-sectional view taken along line B-B of FIG. 9.
Figure 12:
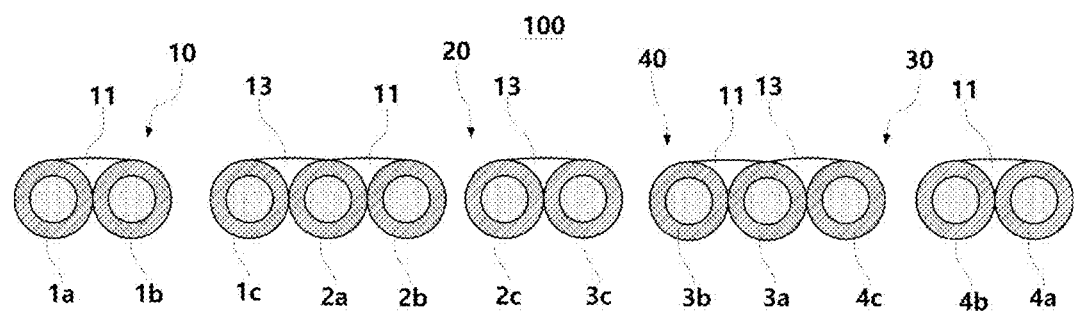
FIG. 12 is a cross-sectional view taken along line C-C of FIG. 9.

FIG. 10 is a cross-sectional view taken along line A-A of FIG. 9, FIG. 11 is a cross-sectional view taken along line B-B of FIG. 9, and FIG. 12 is a cross-sectional view taken along line C-C of FIG. 9.

In FIG. 10, in the optical fiber ribbon 100, optical fibers included in each optical fiber unit 10, 20, 30, and 40 are connected by the continuous connection 11 and the first intermittent connection 12 in the section a. There are no connections between each optical fiber unit. Referring to FIG. 11, in section b, only the continuous connection 11 exists, and the first intermittent connection 12 and the second intermittent connection 13 do not exist. Referring to FIG. 12, in section c, an optical fiber 1c not belonging to the optical fiber pair of the first optical fiber unit 10 and one of the optical fibers 2a belonging to the optical fiber pair of the second optical fiber unit 20 are connected by the second intermittent connection 13. Further, an optical fiber 2c that does not belong to the optical fiber pair of the second optical fiber unit 20 and an optical fiber 3c that does not belong to the optical fiber pair of the third optical fiber unit 30 are connected by the second intermittent connection 13. Finally, one of the optical fibers 3a belonging to the optical fiber pair of the third optical fiber unit 30 is connected to the optical fiber 4c that does not belong to the optical fiber pair of the fourth optical fiber unit 40 by the second intermittent connection 13.

Adjacent optical fibers connected by each of the connections 11, 12, 13 may contact each other or may be separated by a certain gap. In order to embed an optical fiber ribbon into an optical cable at an ultra-high density, it is preferable that optical fibers that are adjacent and connected to each other contact each other. In case there is a gap between these optical fibers, the gap is preferably about 15 µm or less.

In the illustrated embodiment, the connections are present only at the upper side when viewed in the width direction. Compared to the connections arranged to be mixed on the upper side and the lower side when viewed in the width direction, it is advantageous for the optical fiber ribbon to be rolled or folded if connections are arranged on the same side.

Figure 13:
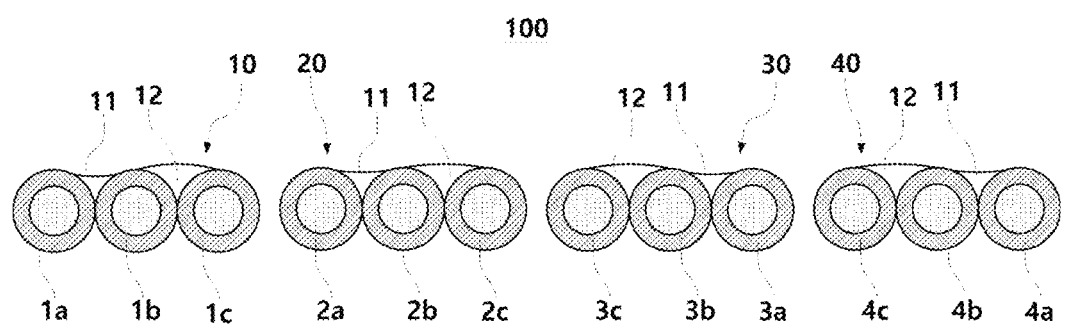
FIG. 13 shows an embodiment in which connections have a different type of surfaces.

In the illustrated embodiment, the surface of the connection is shown almost flat. However, the surface of the connection may have a convex upward shape or a concave downward shape. In FIGS. 10-12, the cross-sections of the continuous connection 11 and the intermittent connections 12 and 13 are shown to have the same shape, but may have cross-sections of different shapes. For example, as shown in FIG. 13, the continuous connection 11 may have a concave downward shape, and the intermittent connection 12 may have an upwardly convex or flat shape. The cross-sectional shapes of the connections 11, 12, and 13 may vary depending on the amount of resin for forming them. That is, if the amount of resin per unit length used to form the connection is small, the surface of the connection part may have a concave shape when viewed from a cross section in the width direction. Conversely, if the amount of resin per unit length used to form the connection is relatively large, the surface of the connection may have a flat or convex shape when viewed from a cross section in the width direction. S Since the continuous connection 11 is continuously present along the length direction, relatively small amount of resin per unit length can maintain good connection. Since each intermittent connection 12 and 13 has its finite length, the amount of resin required to maintain a good connection is larger than that of the continuous connection. In the optical fiber ribbon according to the embodiment of the present invention, a continuous connection and an intermittent connection are arranged adjacent to each other. If one has a concave shape and the other has a flat or convex shape, interference between the connections is reduced when the ribbon is rolled or folded. And, accordingly, the fiber optic ribbon can be mounted in the cable with a higher density.

Figure 15:
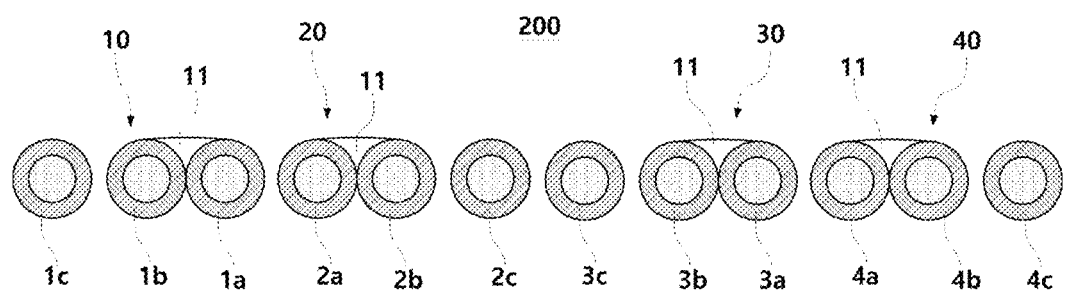
FIG. 15 is a cross-sectional view taken along line A-A in FIG. 14.
Figure 16:
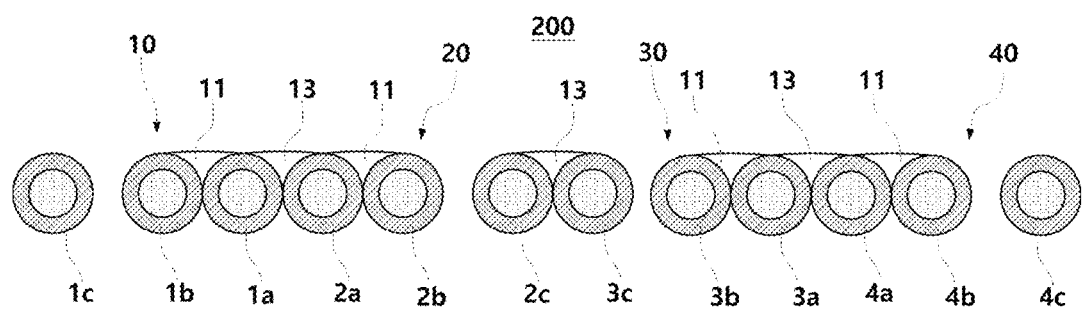
FIG. 16 is a cross-sectional view taken along line B-B of FIG. 14.

FIG. 14 shows a second embodiment of a possible arrangement according to the present invention of an optical fiber ribbon comprising twelve (12) optical fibers, FIG. 15 is a cross-sectional view taken along line A-A of FIG. 14, and FIG. 16 is a cross-sectional view along line B-B of FIG. 14. In the embodiment shown in FIG. 14, the cross-sectional view of the section a is omitted because it has the same shape as the cross-sectional view of FIG. 10.

As shown in FIG. 14, in the section b, the first intermittent connection 12 and the second intermittent connection 13 do not exist, and only the continuous connection 11 exists. In the section c, one of the optical fibers 1a belonging to the optical fiber pair of the first optical fiber unit 10 is connected by the second intermittent connection 13 with one of the optical fibers 2a belonging to the optical fiber pair of the second optical fiber unit 20. Similarly, one of the optical fibers 3a belonging to the optical fiber pair of the third optical fiber unit 30 is connected to one of the optical fibers 4a belonging to the optical fiber pair of the fourth optical fiber unit 40 by the second intermittent connection 13. Further, an optical fiber 2c that does not belong to the optical fiber pair of the second optical fiber unit 20 and an optical fiber 3c that does not belong to the optical fiber pair of the third optical fiber unit 30 are connected by the second intermittent connection 13.

In the embodiment illustrated in FIGS. 14-16, cross-sections of the connections may also have different shape to each other.

Two (2) samples of the optical fiber ribbon having the arrangement shown in FIG. 9 are prepared by adjusting the length of each section differently, and three (3) samples of the optical fiber ribbon having the arrangement shown in FIG. 14 prepared by adjusting the length of each section differently. The optical fiber used in each sample product has a diameter of 250 µm. In order to test the degree of rolling of each sample, the degree of interference was checked while passing each sample through a hole having an inner diameter of 1.5 mm and a hole having an inner diameter of 1.3 mm. Table 2 shows the intensity of interference according to the experiment. In the table, the interference strength 1 indicates a state in which there is no interference, and the interference strength increases from 2 to 6.

As a result of evaluating the workability related to the fusion splicing of the optical fiber ribbon, the longer the section a, the higher the workability. Therefore, when increasing the pitch, it is preferable to increase the length of the section a.

Since a plurality of optical fiber ribbons are mounted in an optical cable, distinct markings are made for each optical fiber ribbon for identification. In the optical fiber ribbon according to the illustrated embodiments, it is preferable to make markings in the section a.

The foregoing detailed description should not be construed as limiting in any respect and should be considered as illustrative. The scope of the present invention should be determined by reasonable interpretation of the appended claims, and all changes within the equivalent scope of the present invention are included in the scope of the present invention.

What is claimed is:

1. An optical cable including rollable optical fiber ribbon, comprising:
    a core portion and a jacket surrounding the core portion, the core portion including:
    a central strength member;
    one or more loose tubes arranged around the central strength member; and,
    one or more rollable optical fiber ribbons being positioned in the respective loose tube, at least parts of the optical fibers of which are intermittently connected along the lengthwise direction,
    wherein the length of each rollable optical fiber ribbon disposed inside the loose tube is 1% or more longer than the length of the corresponding loose tube,
    wherein the terminating loss of each optical fiber of each rollable optical fiber ribbon is 0.4 dB/km or less at a wavelength of 1310 nm and 1383 nm, and 0.3 dB/km or less at a wavelength of 1550 nm and 1625 nm,
    wherein the one or more rollable optical fiber ribbon include at least two optical fiber units,
    wherein each of the optical fiber unit includes an optical fiber, a connected optical fiber pair having two optical fibers connected in a longitudinal direction by a continuous connection, and a first intermittent connection

TABLE 2

| Emb. | Sample No. | Pitch (mm) | Hole Diameter (mm) | section a Interference Strength | section a Length (mm) | section b Interference Strength | section b Length (mm) | section c Interference Strength | section c Length (mm) | section d Interference Strength | section d Length (mm) |
|---|---|---|---|---|---|---|---|---|---|---|---|
| FIG. 9 | 001 | 180 | 1.5 | 1 | 60 | 1 | 30 | 1 | 60 | 1 | 30 |
|  |  |  | 1.3 | 2 |  | 4 |  | 2 |  | 4 |  |
|  | 005 | 120 | 1.5 | 1 | 40 | 1 | 20 | 1 | 40 | 1 | 20 |
|  |  |  | 1.3 | 2.5 |  | 4.5 |  | 2.5 |  | 4.5 |  |
| FIG. 14 | 002 | 180 | 1.5 | 1 | 60 | 1 | 30 | 1 | 60 | 1 | 30 |
|  |  |  | 1.3 | 1 |  | 3 |  | 1 |  | 3 |  |
|  | 003 | 90 | 1.5 | 1 | 30 | 1 | 15 | 1 | 30 | 1 | 15 |
|  |  |  | 1.3 | 3 |  | 6 |  | 1 |  | 6 |  |
|  | 004 | 120 | 1.5 | 1 | 40 | 1 | 20 | 1 | 40 | 1 | 20 |
|  |  |  | 1.3 | 1 |  | 4 |  | 1 |  | 4 |  |

In Table 2, if the interference strength is 4 or less, it is set as good and the minimum value of each section is reviewed as follows: 1) section a is 40 mm or more, 2) section b is 20 mm or more, 3) section c is 30 mm or more. In addition, when the minimum value of each section is added, it can be seen that the minimum pitch in which the same connecting pattern is repeated is 110 mm.

which intermittently connects the optical fiber and the connected optical fiber pair,
    wherein the at least two optical fiber units are intermittently connected by a second intermittent connection,
    wherein the first intermittent connection and the second intermittent connection are arranged alternately with a distance in the longitudinal direction, and wherein the continuous connection, the first intermittent connection and the second intermittent connection are arranged at a same one side of the ribbon between an upper side or a bottom side of the ribbon.

2. The optical cable according to claim 1, wherein the density of the optical fiber of each loose tube is 6.7 to 7.5 per square millimeter of the cross-sectional area of the inner space of the corresponding loose tube.

3. The optical cable according to claim 1, wherein the number of rollable optical fiber ribbons disposed inside each of the loose tubes is 6 to 12.

4. The optical cable according to claim 1, the core portion further includes a waterproof yarn that absorbs water.

5. The optical cable according to claim 1, the core portion further includes a filler disposed in the empty space between the loose tubes to maintain circular shapes of the cross sections of the loose tubes.

6. The optical cable according to claim 1, wherein a diameter of each of the optical fiber is 250 μm, and wherein a length of the first intermittent connection is equal to or greater than 40 mm, the distance between the first intermittent connection and the second intermittent connection is equal to or greater than 20 mm, and a length of the second intermittent connection is equal to or greater than 30 mm.

7. The optical cable according to claim 1, wherein a distance between two adjacent said first connections is equal to or greater than 110 mm.

* * * * *